United States Patent Office 3,375,527
Patented Mar. 26, 1968

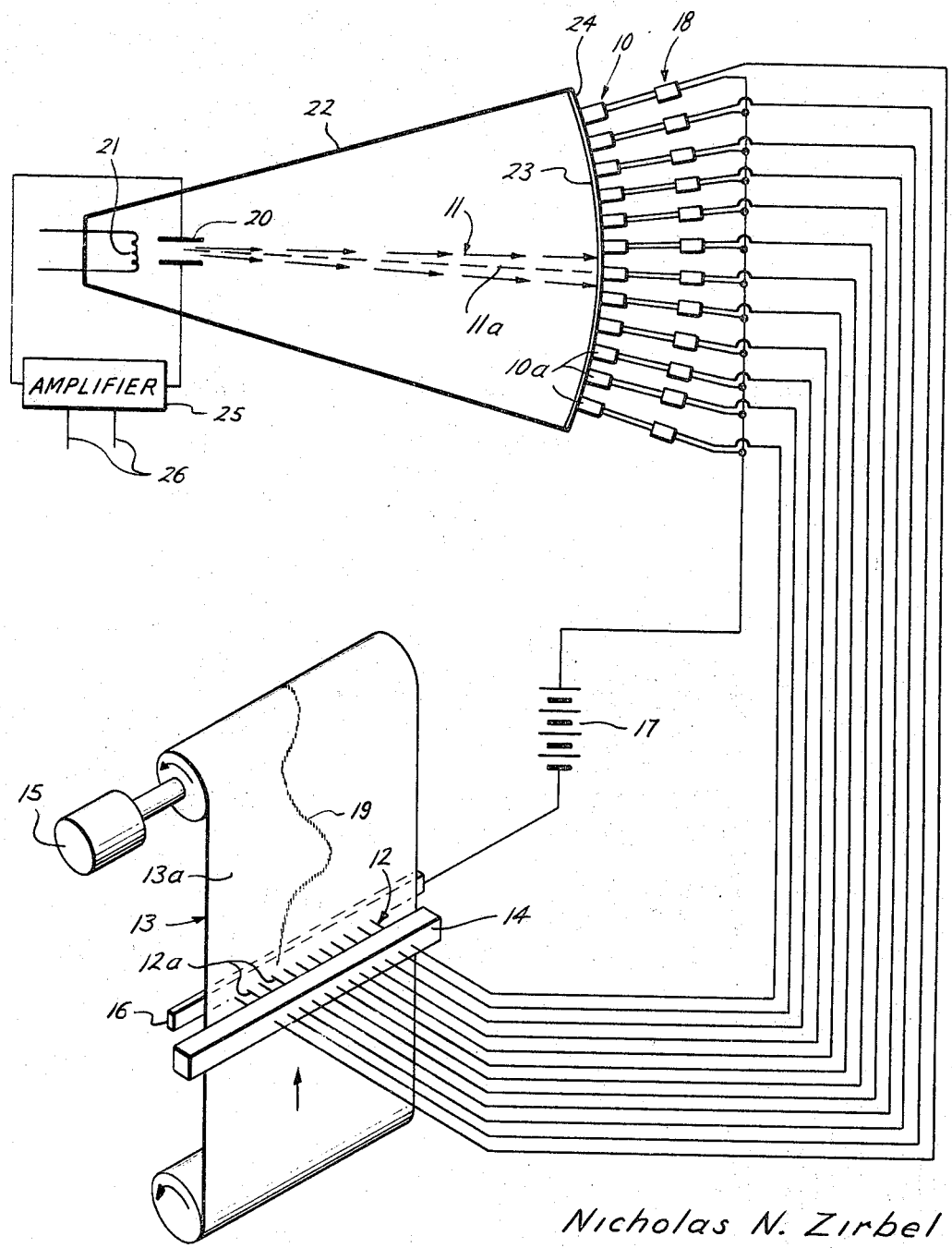

3,375,527
RECORDING APPARATUS
Nicholas N. Zirbel, Houston, Tex., assignor to Independent Exploration Company, Houston, Tex., a corporation of Texas
Continuation-in-part of application Ser. No. 81,086, Jan. 6, 1961. This application Oct. 26, 1964, Ser. No. 406,339
7 Claims. (Cl. 346—74)

This invention relates to recording devices. More particularly, it relates to recording apparatus of the type capable of making a direct and immediately visible indication on a record sheet.

This application is a continuation-in-part of my copending application filed Jan. 6, 1961, Ser. No. 81,086, for Recording Apparatus, now abandoned.

Frequently, it is desirable to provide a record of the changes in or occurrences of phenomena such as temperatures, pressures, electric voltages, seismic events, and the like. In many applications, for example in seismic operations, the recording apparatus for making such a record must be extremely sensitive and capable of recording with great rapidity so that the time of the occurrence of the seismic events being observed can be read from the record to a high degree of accuracy. Further, often it is desirable to provide a record in such operations that is visible from its inception so that it can be read and studied immediately and without further processing.

Most types of recording devices used to make records of the type above mentioned provide either for photographic, magnetic, or pen recording. Of these types, the photographic and magnetic types provide the greatest sensitivity and rapidity of recording, but are considered objectionable, among other reasons, because of their size, cost, complexity, and requirement of further processing of the record before it can be read and studied. The moving pen type of recording apparatus is relatively simple and inexpensive to manufacture and operate and provides a record that is visible from its inception, but is considered objectionable otherwise because it cannot record with sufficient sensitivity and rapidity to permit it to be used successfully in many important applications.

Many designs have been proposed in an effort to develop a recording device which would combine the advantages of sensitivity and rapidity of recording provided by the photographic and magnetic types of recorders with the simplicity, low cost, and immediate availability of the record in a usable form provided by the moving pen type of recorder. However, none of these proposed devices are considered completely satisfactory for use in many important applications. For example, recorders of the type shown in the patent to Silverman No. 2,501,790, utilize a sampling technique and therefore are not capable from a practical point of view of recording the time of a seismic event to the degree of accuracy required. That is, the position of the galvanometer mirror, which is deflected in response to the seismic events to be recorded, is recorded on the record sheet only at one point during each revolution of the scanning cylinder and there is no record of the galvanometer mirror position (and hence the occurrence of a seismic event) between revolutions of the scanning cylinder. In order to overcome this difficulty and make it possible to read a seismic event to an accuracy of .001 second as is usually required, the Silverman scanning cylinder must be turned at a rate of 1,000 revolutions per second. This would require the commutator assembly associated therewith to mechanically make and break each circuit to each marking contactor at the rate of 1,000 times per second. Obviously, such high speed operation is not practical, and the Silverman type devices cannot be used satisfactorily where high sensitivity and rapidity of recording is required. Even in the case of an arrangement such as in Silverman, 2,501,791, which employs electronic scanning, the use of a galvanometer introduces a limiting factor on speed of recording a variable value, and the galvanometer position is recorded at one instant only during each scanning cycle instead of continuously.

My earlier copending application, above mentioned, employed a light beam of negligible mass, but disclosed a galvanometer which has limitations in speed due to the inertia of the mirror thereof.

An object of this invention is to provide a recording device which obviates the foregoing difficulties and disadvantages.

Another object of the invention is to provide a recording device which combines the advantages of presently known photographic, magnetic, and moving pen types of recorders.

Another object of the invention is to provide a sensitive, high speed recording apparatus capable of making a continuous and immediately visible record of the changes in or occurrences of phenomena being observed.

Another object of the invention is to provide recording apparatus for continuously recording, by making an immediately visible mark on a moving record sheet, the position of a rapidly traversing energy beam being moved in response to changes in or occurrences of phenomena being observed.

Another object of the invention is to provide recording apparatus for continuously recording and making an immediately visible record of the position and changes in position of a beam such as a light beam or electron beam of negligible mass being deflected in accordance with changes in or occurrences of phenomena being observed.

Another object is to provide such an apparatus in which the deflecting means for deflecting such a beam will be of negligible mass also.

Another object is to provide such an apparatus in which the beam deflecting means will have no moving mechanical parts.

Another object is to provide such an apparatus in which the effect of the beam in one position may be attenuated or held after the beam may have been moved to another position, so that activations of extremely short duration will be prolonged timewise sufficiently to make certain that they will appear on the finished record.

Another object of the invention is to provide recording apparatus for making a permanent record of the time of occurrence of seismic events that can be read to the degree of accuracy ordinarily required, in which the record is visible at its inception and does not require further processing before it can be read and studied.

Another object of the invention is to provide recording apparatus according to the foregoing objects which is relatively inexpensive and easy to manufacture and use, and which is of relatively light, compact, and rugged construction as compared to presently known recording devices.

Other objects, advantages and features are inherent and will become apparent upon consideration of the specification, claims and attached drawings.

One form of the recording apparatus of this invention with which the foregoing objects and advantages can be accomplished is represented diagrammatically in the single FIGURE of the attached drawing.

As can be seen in the drawing and as will be described in more detail herein below, the recording apparatus of this invention includes a plurality of sensing means 10 situated in the path of an energy beam 11 being traversed or moved in accordance with changes in or occurrences of the phenomenon being observed, each of the sensing means being capable of producing an electric signal when activated by the traversing energy beam and at least one of the several sensing means being so activated at each position the traversing energy beam may take. Obviously in order to insure activation of at least one sensing means at all times and avoid any possible hiatus while the beam is between sensing means, the beam must be wide enough to activate two sensing means for at least a short interval in moving from one sensing means to the next. Suitable means is provided for utilizing the electric signal emitted from each of the activated sensing means to operate a corresponding one of a plurality of electrically actuated marking elements 12 which are mounted adjacent to a moving record sheet 13, each of said marking elements being connected with a corresponding one of said sensing elements and being capable of making a visual indication on the moving record sheet whenever and preferably only so long as it is actuated in response to the electric signal being emitted from its corresponding activated sensing means.

The energy beam 11 for activating the sensing means 10 may comprise any desired type of beam, for example, a light beam, heat beam, radio beam, electron beam, and the like; and the energy beam may be moved or traversed by any suitable means in response to changes in or occurrences of the phenomenon being observed. Illustrated is an electron beam emitted by a source of electrons and which is deflected in accordance with the phenomenon being observed. The beam deflecting means and energy source should be formed and located with respect to one another and with respect to the several sensing means 10 in such a manner that a beam of the energy of desired size and shape is projected toward and activates at least one of the sensing means at all times and at each position to which the deflecting means may deflect it as the charge on the deflecting means varies in response to the changes in or occurrences of a phenomenon being observed. In the apparatus illustrated in the figure, energy beam 11 comprises an electron beam such as a cathode ray 11a being passed between charged plates 20 to deflect it. Cathode ray 11a is produced by a source which includes a filament 21 within a tube or envelope 22. As shown, the relationship between the cathode ray source, deflecting plates, and sensing means is such that the cathode ray will strike and activate an area of a fluorescent screen 23 within the transparent or translucent end 24 of the screen, such that at least one of the sensing means will be activated at each position the cathode ray may take. The plates 20 will be connected as by an amplifier 25 and leads 26 to a source of electric energy which will be modulated in response to and in accordance with and usually as an analog of the occurrences of the phenomena being observed.

A wide variety of sensing means can be used in connection with the recording apparatus of this invention, the primary requirement being that the particular sensing means selected should be capable of producing an electric signal when activated in response to the particular energy beam being used. For example, when a cathode ray is being used as an energy beam, as is the case in the apparatus illustrated in the figure, and the ray is caused to produce a luminous area on a fluorescent coating 23 of phosphor material or the like, light sensitive means of the photoelectric cell type can be employed to advantage. In such case sensing means may comprise a plurality of individual photo electric cells 10a spaced along the traverse of the electron beam 11a, each cell being capable of producing an electric signal whenever and only so long as it is illuminated as a result of the traversing electron beam. As previously mentioned, the several photoelectric cells 10a should be formed and situated with respect to one another and with respect to the path of the ambient light source on the fluorescent screen 23 so that at least one of the cells lies in register with and is illuminated by the lighted area of the fluorescent screen produced by the traversing cathode ray at any given value of the charge on plates 20. In this manner and as will be explained in more detail hereinbelow, one or another of the marking elements 12 will be actuated at all times by the electric signals being emitted from their corresponding illuminated photoelectric cells and thereby caused to make a series of closely spaced visible marks on the record sheet 13, thus providing a continuous visual record of the changes (and hence the value at any given time) of the charge on plates 20.

Any suitable electrically responsive marking elements and record sheet material may be used in connection with the recording apparatus of this invention, the primary requirement being that these components should be selected so that each marking element is capable of making instantly a visible mark or indication on the record sheet material whenever and only so long as it is actuated in response to the electric signal being emitted from its corresponding activated sensing means. For example, in some applications electric styli can be used to advantage as marking elements, particularly when used in conjunction with a record sheet material of the type which changes a visual characteristic upon the passage therethrough of electric current. One type of such voltage sensitive paper is called Teledeltos and is manufactured by the Western Union Company. In other applications, it may be preferable to utilize electrically actuated punches as marking elements, each being capable of punching a hole or otherwise making a visual mark on a punch tape or the like.

In the recording apparatus illustrated in the figure, the electrically actuated marking elements 12 comprise a plurality of electric styli 12a and the record sheet 13 comprises a moving strip 13a of voltage sensitive paper such as the Teledeltos paper above mentioned, each stylus 12a being connected with and operative in response to the electric signal emitted from a corresponding one of photoelectric cells 10a, and the several styli being closely spaced and mounted side by side in a strip 14 of insulation so as to bear against one side of the moving strip of Teledeltos paper. For purposes of clarity, a relatively small number of styli have been shown in the drawing. In actual practice it may be desirable to utilize many more styli spaced much closer together in order to reduce the space between adjacent marks on the record sheet to thereby provide a smoother curve as shown in the drawing. The number of styli (and the number of sensing means) for each application can be determined by routine tests. Suitable means such as the motor 15 is provided for moving the strip of voltage sensitive Teledeltos paper past the electric styli at a desired speed. Conducting means 16 is mounted adjacent to styli 12a and bears against the other side of the moving strip of voltage sensitive paper. With this arrangement, it will be seen that whenever and only so long as an electric signal is being emitted from one of the photoelectric cells 10a, a pulse of current is caused to flow through its corresponding stylus 12a, the moving strip 13a of voltage sensitive paper, and conducting means 16, whereby one or another of the styli is at all times being caused to make a visible mark on said strip, and two adjacent styli will make marks simultaneously when the indication is changing from one to the next.

The electric signal being emitted by the several sensing means may not be sufficiently strong to operate the electrically actuated marking elements directly and without amplification, particularly when ordinary photoelectric cells are used as sensing elements and electric styli are used as marking elements, as is the case in the recording apparatus illustrated in the figure. In order to provide sufficient signal strength to actuate the styli, means is provided for amplifying the electrical signal produced by each sensing means to provide a pulse of current sufficient to cause the corresponding marking element connected with such sensing means to instantly make a visible indication on the record sheet. In the apparatus illustrated in the figure, such amplifying means includes a source of voltage 17 and a plurality of power amplifiers 18. Each of the power amplifiers is connected with one of the photoelectric cells 10a on one side and is connected in an electric circuit on its other side, each of such electric circuits including a corresponding one of the electric styli 12a, the conducting means 16, and the voltage source 17. The power amplifier in each circuit is operable in response to the electric signal produced by its corresponding photoelectric cell, when such cell is illuminated, to close its corresponding electric circuit and thereby cause an electric current to flow through its corresponding stylus, the strip of voltage sensitive paper, and the conductor to produce a visual indication on said strip whenever and only so long as its corresponding photoelectric cell is illuminated by the traversing beam. As will be understood, any suitable power amplifier can be used in the amplifying circuit above described. However, power amplifiers of the semiconductor type, for example, transistors, are preferred since they do not require the use of moving parts and react at very high speeds.

Even with the use of high speed transistors and like elements in the sensing means, amplifiers and marking means, the extremely fast movements which are possible by the electron beam may cause the passing of the beam over a sensing element without producing a corresponding mark on the record. In order to avoid this, the screen 23 may be made of a material which will retain its fluorescence for a finite time—perhaps of the order of ten or fifteen microseconds after the electron beam ceases to impinge upon it. This will make each mark on the record slightly longer than the dwell of the electron beam over the corresponding sensing means and will insure that each sensing means will be activated and a corresponding mark made on the record, no matter how short the dwell of the electron beam on the screen 23 over the sensing means.

From the foregoing it will be clear that inasmuch as one or another of the several sensing means is being activated by the traversing energy means at all times so as to produce an electric signal which is in turn utilized to operate a corresponding marking element causing it to make a visual indication on the moving record sheet, the traversing energy beam cannot assume a position in response to a change in or occurrence of the phenomenon being observed that will not be reflected instantly by a visual mark on the record sheet. Thus, even though the energy beam may move or cycle rapidly and indiscriminately over its traverse, a trace or curve, indicated generally at 19, corresponding to the movement of the energy beam and comprising a series of closely spaced visual marks will be made on the moving record sheet, whereby the position of the energy beam at any given time and hence the time of change in or occurrence of the phenomenon being observed, can be readily determined to the degree of accuracy required merely by taking a direct reading from the record sheet.

It also will be clear from the foregoing description that the recording apparatus of this invention is capable without substantial modification of simultaneously making a visible record of the movements of a plurality of traversing energy beams such as may be employed in seismic operations or the like. That is, and with reference to seismic operations, it is common practice to utilize signals from a plurality of seismic wave receiving stations to operate a corresponding plurality of pairs of control plates 20 each pair of which will cause and control deflection of a cathode ray from a suitable source 21. The recording apparatus of this invention of the type illustrated in the drawing can be used without modification to simultaneously record the variations in charges on each of the pairs of plates 20, the primary requirement being that each electron beam 11a being deflected by each pair of plates 20 should at all times impinge upon the area of screen 23 overlying one or another of the photoelectric cells 10a as described above. Under these conditions, a separate trace or curve 19 corresponding to the changes in charge on each pair of plates 20 will be made on the moving strip 13a of voltage sensitive paper. It is not necessary to increase either the number of photoelectric cells or the number of electric styli since each photoelectric cell will cause its corresponding electric stylus to instantly make a visible mark on the moving strip of paper whenever and only so long as such cell is illuminated by the fluorescent screen 20 as acted upon by any one of the deflected beams. Further, it is not necessary to utilize a wider strip of voltage sensitive paper since the several traces or curves may cross one another if necessary.

While the apparatus described is especially adapted to the production of a visible record, it will be readily understood that it may be utilized by well known modification, for the production of conventional non-visible records.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for recording variations in an electrical potential comprising: means for producing an energy beam, means for deflecting said energy beam in accordance with changes in said electrical potential, a plurality of spaced sensing means situated in the path of said energy beam, each capable of producing an electric signal when activated by the beam, the several sensing means being disposed at least close enough to adjacent sensing means relative to the effective width of the beam so that the beam in deflecting from activation of one sensing means toward activation of the next adjacent sensing means will activate such next adjacent sensing means before ceasing to activate said one sensing means, whereby at least one of said sensing means will be so activated at any given position of the energy beam, and recording means including a record sheet, a plurality of closely spaced electrically actuated marking elements mounted adjacent to the sheet and aligned in one direction thereacross and capable of producing an indication thereon when actuated, each of said marking elements being connected with certain of said sensing elements and being actuated to place indications on the record sheet in response to the electric signal emitted from each such sensing element whenever the sensing element is activated, and means for imparting to said record sheet continuous movement past said marking elements in a direction transverse to their alignment whereby at least one of said marking elements will be actuated to so mark the record sheet for any given position of the energy beam and the record produced on said record sheet will be continuous in the direction of movement of said sheet.

2. Apparatus for recording variations in an electrical potential comprising: means for producing an energy beam, means for deflecting said energy beam in accordance with changes in said electrical potential, a plurality of spaced sensing means situated in the path of said energy beam, each capable of producing an electric signal when activated by the beam, the several sensing means being disposed at least close enough to adjacent sensing means relative to the effective width of the beam so that the beam in deflecting from activation of one sensing means toward activiation of the next adjacent sensing means will activate such next adjacent sensing means before ceasing to activate said one sensing means, whereby at least one of said sensing means will be so activated at any given position of the energy beam, and recording means including a record sheet, a plurality of closely spaced electrically actuated marking elements mounted adjacent to the sheet and aligned in one direction thereacross and capable of producing a visual mark thereon when actuated, each of said marking elements being connected with a corresponding one of said sensing elements and being actuated to mark the record sheet in response to the electric signal emitted from such sensing element whenever and so long as the sensing element is activated, and means for imparting to said record sheet continuous movement past said marking elements in a direction transverse to their alignment whereby at least one of said marking elements will be actuated to so mark the record sheet at all times and at any given position of the energy beam and the record produced on said record sheet will be continuous in the direction of movement of the sheet.

3. Apparatus for continuously recording the position and movements of an angularly movable energy beam comprising a plurality of energy sensing elements situated in the path of movement of said angularly movable energy beam, each of said sensing elements being capable of producing an electric signal when acted upon by the energy beam, the several sensing elements being disposed close enough together that at least one of them is so activated by the energy beam at each point along the beam's swinging path and so that two of them will be actuated simultaneously for at least a brief period during movement of the beam from activation of one sensing element to the next adjacent sensing element, and recording means including an elongated record sheet, means for moving said sheet longitudinally of itself at a predetermined speed, and a plurality of spaced electrically actuated marking elements mounted adjacent to said record sheet and in alignment across one face thereof transverse to the direction of movement of said sheet, each of said marking elements being connected with a corresponding one of said sensing elements and actuated in response to the electric signal emitted from such sensing element when it is activated, to produce a visual mark on said record sheet and being disposed in the same order across said sheet as the sensing elements to which they are attached are disposed along said path of movement of the beam and close enough to each other so that actuation successively of adjacent sensing elements will produce a substantially continuous record on said sheet, at least one of said marking elements being so actuated to mark the record sheet at all times and at any given position of said energy beam.

4. Apparatus for recording variations in an electrical potential comprising: means for producing an electron beam, means for deflecting said electron beam in accordance with changes in said electrical potential, a plurality of spaced sensing means situated in the path of said electron beam, each capable of producing an electric singal when activated by the beam, the several sensing means being disposed at least close enough to adjacent sensing means relative to the effective width of the beam so that the beam in deflecting from activation of one sensing means toward activation of the next adjacent sensing means will activate such next adjacent sensing means before ceasing to activate said one sensing means, whereby at least one of said sensing means will be so activated at any given position of the electron beam, and recording means including a record sheet and a plurality of closely spaced electrically actuated marking elements mounted adjacent to the sheet and capable of producing an indication thereon when actuated, each of said marking elements being connected with certain of said sensing elements and being actuated to place indications on the record sheet in response to the electric signal emittted from each such sensing element whenever and so long as the sensing element is activated, whereby at least one of said marking elements will be actuated to so mark the record sheet at all times and at any given position of the electron beam.

5. Apparatus for recording variations in an electrical potential in accordance with claim 4 in which said sensing elements are light sensitive elements in position to receive light and be activated thereby and there is a fluorescent material in light transmitting relationship to each such sensing means which fluorescent material is also located in the path of movement of said electron beam to be activated and rendered luminous thereby.

6. Apparatus for recording variations in an electrical potential in accordance with claim 5 in which said fluorescent material is of a character to provide lingering fluorescence for a predetermined time after cessation of activation by said electron beam.

7. Apparatus for recording variations in an electrical potential in accordance with claim 5 in which said fluorescent material is a screen disposed along the path of movement of said electron beam so that a portion of said screen will be rendered luminous at any given time, the position of such portion depending upon the degree of deflection of the beam at such time, and in which said sensing means are each disposed to be activated by luminescence of a different portion of said screen.

References Cited

UNITED STATES PATENTS

| | | | |
|---|---|---|---|
| 2,432,303 | 12/1947 | Fox | 234—61 |
| 2,501,791 | 3/1950 | Silverman | 346—33 |
| 3,007,049 | 10/1961 | McNaney | 250—49.5 |
| 3,090,828 | 5/1963 | Bain | 178—6.6 |

TERRELL W. FEARS, *Primary Examiner.*

IRVING L. SRAGOW, *Examiner.*

F. C. WEISS, *Assistant Examiner.*